3,489,730
ALKYLIDENEPEROXIDES, METHOD FOR PREPARING SAME AND VULCANIZABLE COMPOSITIONS OBTAINED THEREFROM
Carlo Buttar, Ferrara, and Emilio Martini, Bologna, Italy, assignors to Montecatini Edison S.p.A., Milan, Italy
No Drawing. Filed Dec. 1, 1965, Ser. No. 510,941
Claims priority, application Italy, Dec. 3, 1964, 26,002/64
Int. Cl. C08f *45/72;* C07c *73/00*
U.S. Cl. 260—80.78    25 Claims

ABSTRACT OF THE DISCLOSURE

Preparing alkylideneperoxides by transperoxidation reaction, in absence of catalysts, at a temperature of from about 35° to 110° C., while continuously distilling off hydroperoxide released during the reaction. New tertiary aralkyl alkylidene-peroxides are produced by such process which are useful for vulcanizing olefinic copolymers and terpolymers.

---

The present invention relates to a new process for the synthesis of organic peroxides, which peroxides can be employed as vulcanizing agents for elastomers, and plastomers, more particularly for saturated amorphous copolymers of ethylene with an alpha-olefin. Further, the present invention relates to new alkylideneperoxides of the formula,

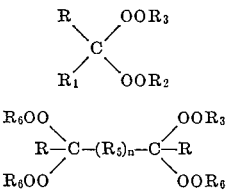
(I)

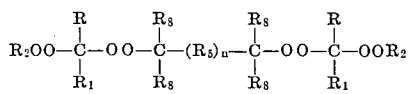
(II)

or $$R_2OO-\underset{\underset{R_1}{|}}{\overset{\overset{R}{|}}{C}}-OO-\underset{\underset{R_8}{|}}{\overset{\overset{R_8}{|}}{C}}-(R_5)_n-\underset{\underset{R_8}{|}}{\overset{\overset{R_8}{|}}{C}}-OO-\underset{\underset{R_1}{|}}{\overset{\overset{R}{|}}{C}}-OOR_2 \quad (III)$$

wherein:
R and $R_1$ are each selected from the group consisting of hydrogen, alkyl, aryl and aralkyl radicals, or wherein R and $R_1$ may, taken together and in conjunction with the central carbon atom (C), form a cycloaliphatic ring;
$R_2$ and $R_3$ are each selected from the group consisting of tertiary alkyl, tertiary aralkyl, and wherein —$OOR_3$ is derived from a hydroperoxide which decomposes in the presence of strong acid;
$R_5$ is selected from the group consisting of alkylene, arylene and aralkylene radicals and $n$ is 1;
$R_6$ is selected from the group consisting of $R_2$ and $R_3$, and
$R_8$ is each selected from the group consisting of hydrogen and alkyl radicals.

The production of these new alkylideneperoxides has been made possible by the process of the present invention, as is hereinafter explained in a more detailed description of the invention.

The present invention is also concerned with vulcanizable compositions of natural or synthetic elastomers and plastomers containing these alkylideneperoxides and vulcanized articles prepared therefrom.

It is known in the art to synthesize alkylideneperoxides by reacting carbonyl compounds with organic hydroperoxides in the presence of homogeneous catalysts consisting of strong inorganic acids.

However, some hydroperoxides, in the presence of strong acids, undergo a rapid decomposition resulting in the formation of a ketone. Therefore, alkylideneperoxides cannot be prepared by reaction of these hydroperoxides with a carbonyl compound if their decomposition rate in the presence of the acid catalysts is higher than the rate of formation of the alkylideneperoxides. For example, cumyl alkylideneperoxide cannot be synthesized by reaction of a carbonyl compound with cumyl hydroperoxide in an acid medium because the latter decomposes into phenol and acetone, said decomposition being utilized in industry in the final stage of a process for the synthesis of phenol from benzene and propylene.

The literature reports a known exchange reaction, which occurs in the absence of catalysts, between acetals or orthoesters and hydroperoxides, with the production of peroxyethers and perorthoesters (A. Rieche et al., Chemische Berichte 94, 2457 and 91, 1942) according to the following equations:

(1)
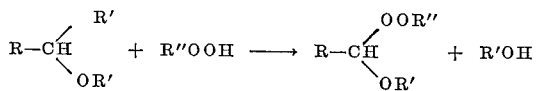

(2)
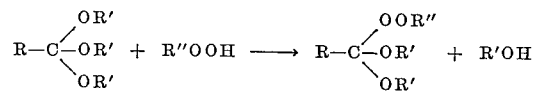

It has now been found that transperoxidation of some alkylideneperoxides, prepared by the aforementioned direct acid catalyzed reaction between a carbonyl compound and a hydroperoxide which does not decompose rapidly in the presence of strong acids, can be effected by an exchange reaction with other hydroperoxides which may be of the type which decompose rapidly in the presence of acid, by heating in the absence of catalysts.

The transperoxidation, through which new alkylideneperoxides are obtained as exchange products, occurs according to the following equations:

(3) 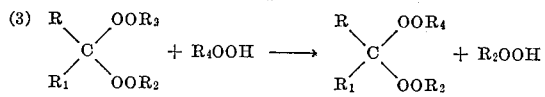

(4) 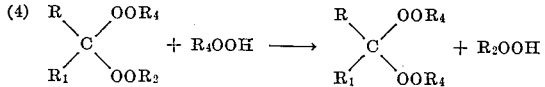

(5)
$$\underset{\underset{R_2OO}{|}}{\overset{\overset{_2OOR}{|}}{R-C}}-(R_5)_n-\underset{\underset{OR_2}{|}}{\overset{\overset{OOR_2}{|}}{C}}-R \quad + mR_4OOH \longrightarrow$$

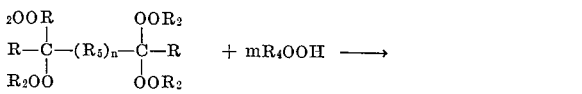 $+ mR_2OOH$ (6)
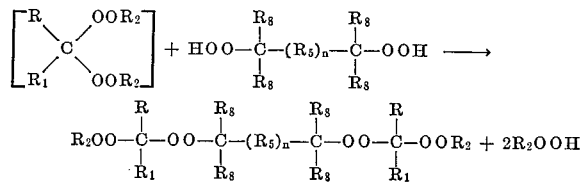

$$R_2OO-\underset{\underset{R_1}{|}}{\overset{\overset{R}{|}}{C}}-OO-\underset{\underset{R_8}{|}}{\overset{\overset{R_8}{|}}{C}}-(R_5)_n-\underset{\underset{R_8}{|}}{\overset{\overset{R_8}{|}}{C}}-OO-\underset{\underset{R_1}{|}}{\overset{\overset{R}{|}}{C}}-OOR_2 + 2R_2OOH$$

wherein:
R and $R_1$ are each selected from the group consisting of hydrogen, alkyl, aryl and aralkyl radicals, or wherein R and $R_1$ may, taken together and in conjunction with the central carbon atom (C), form a cycloaliphatic ring;
$R_2$ and $R_4$ are each selected from the group consisting of tertiary alkyl, tertiary aralkyl, and wherein —OOR$_4$ may or may not be derived from a hydroperoxide which decomposes in the presence of strong acid;

R$_5$ is selected from the group consisting of alkylene, arylene and aralkylene radicals and $n$ is 1;

R$_7$ is selected from the group consisting of R$_2$ and R$_4$; and $m$ is an integer from 1 to 4.

R$_8$ is each selected from the group consisting of hydrogen and alkyl radicals.

Referring particularly to Equations 3 and 4, the transperoxidation may lead to the successive substitution of one or both the original peroxidic groups (—OOR$_2$) by the groups derived from the R$_4$ hydroperoxides. Whether one or both R$_2$ peroxidic groups are replaced depends essentially on the contact time between the reactants, for the two successive substitutions take place at different rates, a longer time being required for the second substitution (Equation 4).

The two reactions lead to an equilibrium which can be easily shifted to the right in the usual manner either by using an excess of the reactants or by continuously removing one or both the reaction products.

It is evident that the second alternative is generally much more economical and can be readily effected when the hydroperoxide which is formed has a boiling point lower than that of the other components of the reaction mixture, more particularly a boiling point lower than that of the hydroperoxide (R$_4$OOH) used in the exchange reaction, so that it can be continuously removed from the mixture by distillation at the reaction temperature.

In certain cases the addition of a suitable azeotropic agent or the use of a reduced pressure can favor the removal of the hydroperoxide R$_2$OOH.

As can be understood, this method of synthesis is completely general but is particularly useful when the hydroperoxide R$_4$OOH, to which the desired alkylideneperoxide, for example,

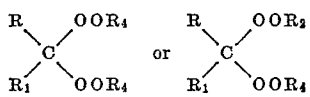

corresponds, is R$_3$OOH, i.e. it decomposes in the presence of strong acids and therefore cannot be used in the direct acid catalyzed synthesis. In this case the direct synthesis, using the normal acid catalysts, is carried out with the carbonyl compound,

and another hydroperoxide R$_2$OOH which does not decompose in the presence of strong acid and thereafter the exchange reaction between the alkylideneperoxide thus formed and the hydroperoxide R$_3$OOH is effected, since the latter, uncatalyzed, reaction does not lead to the decomposition of this hydroperoxide.

The present invention therefore provides a process for preparing alkylideneperoxides of the formula,

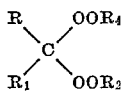

or

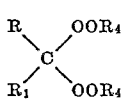

or

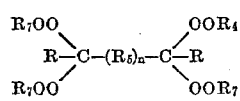

or

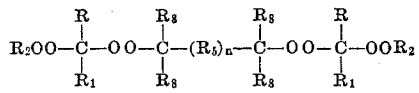

wherein:

R and R$_1$ are each selected from the group consisting of hydrogen, alkyl, aryl and aralkyl radicals, or wherein R and R$_1$ may, taken together and in conjunction with the central carbon atom (C), form a cycloaliphatic ring;

R$_2$ and R$_4$ are each selected from the group consisting of tertiary alkyl, tertiary aralkyl, and wherein —OOR$_4$ may or may not be derived from a hydroperoxide which decomposes in the presence of strong acid;

R$_5$ is selected from the group consisting of alkylene, arylene and aralkylene radicals and $n$ is 1;

R$_7$ is selected from the group consisting of R$_2$ and R$_4$, and R$_8$ is each selected from the group consisting of hydrogen and alkyl radicals, which process comprises reacting a preformed alkylideneperoxide of the formula,

or

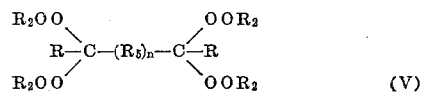

with a hydroperoxide, R$_4$OOH, or reacting (IV) with a dihydroperoxide of the formula

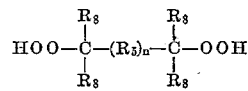

said hydroperoxide and dihydroperoxide being less volatile than the R$_2$OOH hydroperoxide, in the absence of catalysts, at a temperature from 35° to 110° C., preferably from 65° to 90° C., and continuously removing by distillation, preferably under vacuum, the R$_2$OOH released until 1 mole of hydroperoxide R$_2$OOH has been removed per mole of starting alkylideneperoxide.

In accordance with the present invention, the exchange reaction may be continued until 2, 3 or 4 mols of hydroperoxide R$_2$OOH are removed per 1 mole of starting alkylideneperoxide, to replace R$_2$OO— radicals on the alkylideneperoxide with R$_4$OO— radicals.

Further, in accordance with the present invention, there are provided vulcanizable compositions comprising synthetic elastomers, more particularly saturated amorphous copolymers of ethylene with alpha-olefins or low-unsaturation olefin terpolymers, optionally including a free-radical acceptor co-agent and a reinforcing filler, which contain as the vulcanizing agent an alkylideneperoxide obtained according to the described process. The alkylideneperoxide is incorporated in the composition in an amount of from about 0.1 to 10 parts by weight, preferably from 1 to 5 parts by weight, per 100 parts of copolymer of terpolymer.

Also provided by the present invention are the vulcanized articles obtained from the aforedescribed vulcanizable compositions, by heating to a temperature higher than the decomposition temperature of the alkylideneperoxide, preferably between 120–320° C., for a time varying from 1 minute to 120 minutes.

As already mentioned, the invention allows the synthesis of new alkylideneperoxides containing peroxide radicals derived from hydroperoxides which decompose in the presence of acid catalysts. These alkylideneperoxides, obtained according to the present invention are new compounds.

Among these hydroperoxides, particularly important are: e.g. dimethylbenzyl hydroperoxide, p-diisopropylbenzene-monohydroperoxide, m-diisopropylbenzene-monohydroperoxide, p-diisopropylbenzene-dihydroperoxide and m-diisopropylbenzene-dihydroperoxide.

The alkylideneperoxides which can be used in the transperoxidation include, e.g. the alkylideneperoxides derived from the reaction between aliphatic, alicyclic or aromatic carbonyl compounds as well as polycarbonylic compounds, and hydroperoxides which do not decompose in the presence of acid catalysts such as p-methyl-hydroperoxide, 2,5-dihydroperoxy-2,5-dimethylhexane, 2,5-dihydroperoxy-2,5-dimethylhexene-3, diphenylmethyl-hydroperoxide, 1-methyl-1-hydroperoxy-cyclohexane, 1-phenyl-1-hydroperoxy-cyclohexane, tetralin-hydroperoxide and Decalin-hydroperoxide. More specifically, these include the reaction products of carbonyl compounds, for example, acetaldehyde, benzaldehyde, acetone, methylethylketone, acetylacetone, acetonylacetone, cyclohexanone, 3,5,5-trimethylcyclohexanone, cyclohexandione and acetophenone, and esters of ketoacids, for example, acetoacetic acid, levulinic acid, etc., with hydroperoxides, for example tert.butyl-, tert.amyl-, p-methyl-, cyclohexyl-, cyclopentyl- methylcyclohexyl- and methylcyclopentyl-hydroperoxides.

Particularly advantageous are the alkylideneperoxides derived from tert. butyl hydroperoxide because of the low boiling point of this hydroperoxide as compared with that of about all other hydroperoxides.

The alkylideneperoxide obtained is then purified by alkaline washing in order to remove the excess hydroperoxide and is then distilled and recrystallized.

Although the alkylideneperoxides obtained by the transperoxidation method are particularly useful, as illustrated hereinbelow, in the vulcanizable compositions containing natural and synthetic elastomers, they also can be used conveniently as initiators for the polymerization of unsaturated monomers, as cross-linking agents for plastomers and as vulcanizing agents for natural rubbers or of saturated or unsaturated synthetic rubbers.

Among the synthetic elastomers which are vulcanizable with the alkylideneperoxides of the present invention, of particular importance are the saturated amorphous copolymers of ethylene with propylene or butene-1, having an ethylene content of between about 20 and 80 mol percent and a molecular weight between about 50,000 and 800,000, preferably between 60,000 and 500,000, and the terpolymers of ethylene with propylene and a cyclic or acyclic polyene containing non-conjugated double bonds, having a molecular weight and an ethylene molar content of the same order of magnitude as the ethylene copolymer and from 0.05 to 1 double bond per 100 carbon atoms.

The following examples serve to further illustrate the present invention without limiting its scope.

EXAMPLE 1

Preparation of 2,2-di(alpha,alpha'-dimethyl-benzylperoxy)propane

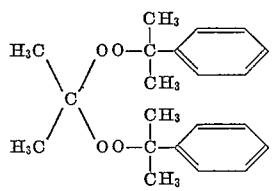

A mixture of 22 g. (0.1 mol) of 2,2-di(tert.butyl-peroxy) propane and 40.3 g. (0.25 mol) of dimethyl-benzyl hydroperoxide was placed in a flask maintained at 85° C. under 20 mm. Hg of pressure. The reaction was continued for 15 hours, during which time 17–18 g. tert.butylhydroperoxide (which represent about 95–100% of the calculated amount) were distilled off under a residual pressure of 40 torr.

The residue was dissolved in 25 cc. of ethylether, washed 5 times with a 10% NaOH solution and then with water and then the ether was evaporated on anhydrous $Na_2SO_4$.

After evaporation of ethylether, the residue consists of 29.2 g. (yield=86%) of crude 2,2-di(alpha,alpha'-dimethylbenzylperoxy)-propane.

In order to purify this peroxide, the crude product was percolated in a chromatographic column filled with alumina (aluminum oxide of basic type for chromatography of the Carlo Erba Co.) and eluted with petroleum ether.

By evaporation of the solvent from the solution pure 2,2-di(alpha,alpha'-dimethylbenzylperoxy) propane was obtained in a yield of 89%, based on the crude product.

The purified product had the following characteristics: $n_D^{20}=1.5062$

| | Found | Calculated |
|---|---|---|
| Molecular weight | 322 | 344 |
| Active oxygen, percent | 9.8 | 9.3 |
| Carbon, percent | 67.3 | 73.20 |
| Hydrogen, percent | 8.15 | 8.14 |

EXAMPLE 2

Preparation of 2,2,5,5-tetra(alpha,alpha'-dimethylbenzylperoxy)hexane

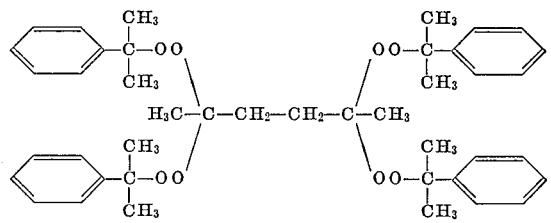

A mixture consisting of 20 g. of 2,2,5,5-tetra(t-butylperoxy)hexane (0.045 mol) and 25 g. of dimethylbenzyl hydroperoxide (0.165 mol) was heated at 90° C. for 18 hours, during which time 16 g. of tert.butylhydroperoxide (97% of the calculated amount) were distilled off.

The crude peroxide obtained was purified by alkaline washing and by chromatography on alumina as described in Example 1, yielding 92%, based on the crude, of the purified product.

The purified 2,2,5,5-tetra(alpha,alpha'-dimethylbenzylperoxy)hexane had the following characteristics:

| | Found | Calculated |
|---|---|---|
| Molecular weight | 625 | 686 |
| Carbon, percent | 72.4 | 73.47 |
| Hydrogen, percent | 7.8 | 7.87 |
| Active oxygen, percent | 9 | 9.3 |

Its use as a vulcanizing agent for an ethylene-propylene copolymer is illustrated below.

A mix having the following composition was prepared:

Parts by wt.
Ethylene-propylene copolymer (55% mol percent of ethylene and a Mooney ML (1+4) 100° C.=45) _____ 100
Carbon black HAF _____ 50
Zinc oxide _____ 3
Sulfur _____ 0.32
2,2,5,5 - (alpha,alpha' - dimethylbenzylperoxy)propane _____ 6.86

The mix was vulcanized at 150° C. for 30 minutes in a press.

The vulcanizate showed the following mechanical characteristics:

Tensile strength, kg./cm.$^2$ _____ 181
Elongation at break, percent _____ 430
Modulus of elasticity at 300%, kg./cm.$^2$ _____ 112
Modulus of elasticity at 200%, kg./cm.$^2$ _____ 56
Permanent set $D_1$, percent _____ 10
ISO hardness, percent _____ 17

EXAMPLE 3

Preparation of 1-tert.butylperoxy-1(alpha,alpha'-dimethylbenzylperoxy)cyclohexane

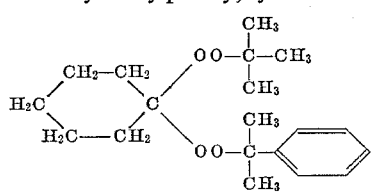

A mixture of 26 g. (0.1 mol) of 1,1-di(tert.butylperoxy)cyclohexane and 15.2 g. of dimethylbenzyl hydroperoxide was heated to 90° C. under about 40 torr for 7 hours, during which time 9 g. of tert.butylhydroperoxide (101% of the calculated amount) were distilled off.

The reaction residue, after the purification carried out as in Example 1, consisted of 22 g. of 1-tert.butylperoxy-1 - (alpha,alpha' - dimethylbenzylperoxide)cyclohexane. The purified product had the following characteristics:

|  | Found | Calculated |
| --- | --- | --- |
| Molecular weight | 306 | 322 |
| Carbon, percent | 69.8 | 70.9 |
| Hydrogen, percent | 9.1 | 9.3 |
| Active oxygen, percent | 9.1 | 9.9 |

It was used as a vulcanizing agent for the ethylene-propylene copolymer used in Example 2 in the following mixture:

|  | Parts by wt. |
| --- | --- |
| Ethylene-propylene copolymer (see Example 2) | 100 |
| Carbon black HAF | 50 |
| Zinc oxide | 3 |
| Sulfur | 0.32 |
| 1-tert.butylperoxy-1 - (alpha,alpha'-dimethylbenzylperoxy)cyclohexane | 9.6 |

The mix was vulcanized at 150° C. for 40 minutes as in Example 2.

The mechanical characteristics of the vulcanizates were as follows:

| Tensile strength, kg./cm.² | 175 |
| --- | --- |
| Elongation at break, percent | 410 |
| Modulus of elasticity at 300%, kg./cm.² | 106 |
| Permanent set, percent | 10.5 |
| ISO hardness, percent | 55 |

EXAMPLE 4

Preparation of 1,4-[2,2'-di(tert. butylperoxy-isopropylperoxy)]diisopropylbenzene

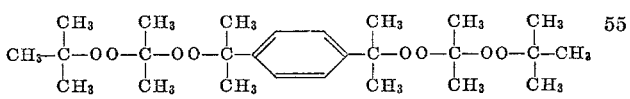

44 g. of 2,2-di(tert. butylperoxy) propane and 22.6 g. of 1,4-diisopropylbenzene-dihydroperoxide were placed in a flask and kept at 95° C. for 13 hours, during which time 17.3 g. of tert. butylhydroperoxide were distilled off under a residual pressure of 40 torr.

The waxy residue was dissolved in an equal volume of ether, washed three times with 10% NaOH and then with water, dried on anhydrous $Na_2SO_4$ and the ether evaporated.

The residue was then kept under a vacuum of 1 torr at 50° C. for 4 hours in order to eliminate the low boiling products. The viscous residue was then extracted with a 75% water-alcohol mixture. The alcohol solution was then diluted with water, extracted with ether, and the ether solution dried and the ether evaporated.

The residue (17 g.) consisted of 1,4-[2,2'-di(tert. butylperoxy-isopropylperoxy)] diisopropylbenzene and had the following characteristics:

|  | Found | Calculated |
| --- | --- | --- |
| Active oxygen, percent | 11.9 | 12.6 |
| Carbon, percent | 60.2 | 61.6 |
| Hydrogen, percent | 9.15 | 9.1 |
| Molecular weight | 485 | 506 |

It was used as vulcanizing agent for the ethylene-propylene copolymer used in Example 2 in a mixture having the following composition:

|  | Parts by wt. |
| --- | --- |
| Ethylene-propylene copolymer | 100 |
| Carbon black HAF | 50 |
| Zinc oxide | 3 |
| Sulfur | 0.32 |
| 1,4-[2,2'-di(tert. butylperoxy-isopropylperoxy)]-diisopropylbenzene | 6.2 |

The mix was vulcanized at 150° C. for 40 minutes as in Example 2.

The mechanical characteristics of the vulcanizate were as follows:

| Tensile strength, kg./cm.² | 168 |
| --- | --- |
| Elongation at break, percent | 425 |
| Modulus of elasticity at 300%, kg./cm.² | 102 |
| Permanent set $D_1$, percent | 11 |
| ISO hardness, percent | 54 |

Having thus described our invention, what we desire to secure by Letters Patent and hereby claim is:

1. A process for the preparation of alkylidene-peroxides having the formula,

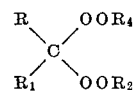

or

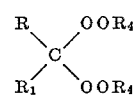

or

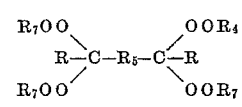

or

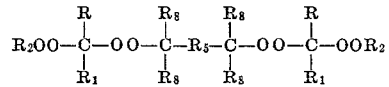

wherein:
  R and $R_1$ are each selected from the group consisting of hydrogen, alkyl, aryl, and aralkyl radicals, or wherein R and $R_1$ may, taken together and in conjunction with the central carbon atom (C), form a cycloaliphatic ring;
  $R_2$ and $R_4$ are each selected from the group consisting of tertiary alkyl and tertiary aralkyl;
  $R_5$ is selected from the group consisting of alkylene, arylene and aralkylene radicals;
  $R_7$ is selected from the group consisting of $R_2$ and $R_4$ and each $R_8$ is selected from the group consisting of hydrogen and alkyl radicals, which process comprises reacting a preformed alkylideneperoxide having the formula,

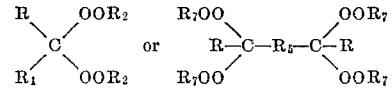

with a hydroperoxide of the formula R₄OOH or reacting

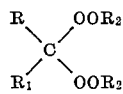

with a dihydroperoxide of the formula

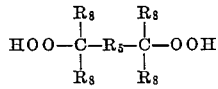

said hydroperoxide R₄OOH and dihydroperoxide being less volatile than the hydroperoxide R₂OOH, in the absence of catalysts, at a temperature of from about 35° to 110° C., and continuously distilling off the R₂OHH released until at least 1 mol of hydroperoxide R₂OOH has been eliminated per mol of starting alkylideneperoxide.

2. The process of claim 1 wherein R₄ is tertiary aralkyl.

3. The process of claim 1 wherein the exchange reaction is carried out until 2 mols of R₂OOH hydroperoxide have been eliminated per mole of starting alkylideneperoxide.

4. The process of claim 1 wherein the exchange reaction is continued until all of the —OOR₂ radicals have been replaced by —OOR₄ radicals.

5. The process of claim 1 wherein the preformed alkylidene, peroxide is reacted with the R₄OOH hydroperoxide in a molar ratio of between about 1:1 and 1:4.

6. The process of claim 5 wherein the preformed alkylidene peroxide is reacted with the R₄OOH hydroperoxide in a molar ratio of between about 1:1 and 1:2.

7. The process of claim 3 wherein the preformed alkylidene peroxide is reacted with the R₄OOH hydroperoxide in a molar ratio of between about 1:2 and 1:4.

8. The process of claim 1 wherein the reaction is carried out at a temperature of from 65° to 90° C.

9. The process of claim 1 wherein the R₄OOH hydroperoxide is selected from the group consisting of cumyl hydroperoxide, p-diisopropylbenzenemonohydroperoxide and m-diisopropylbenzenedihydroperoxide.

10. An alkylideneperoxide of the formula,

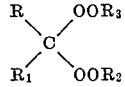

wherein:

R and R₁ are each selected from the group consisting of hydrogen, alkyl, aryl and aralkyl radicals, or wherein R and R₁ may, taken together and in conjunction with the central carbon atom (C), form a cycloaliphatic ring;
R₂ is selected from the group consisting of tertiary alkyl and tertiary aralkyl radicals; and
R₃ is a tertiary aralkyl radical.

11. An alkylideneperoxide of the formula,

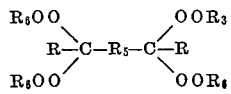

wherein:

R is selected from the group consisting of hydrogen and alkyl radicals;
R₃ is a tertiary aralkyl radical;
R₅ is an alkylene radical; and
R₆ is selected from the group consisting of tertiary alkyl and tertiary aralkyl radicals.

12. An alkylideneperoxide of the formula,

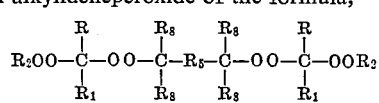

wherein:

R and R₁ are each selected from the group consisting of hydrogen, alkyl, aryl and aralkyl radicals, or wherein R and R₁ may, taken together and in conjunction with the central carbon atom (C), form a cycloaliphatic ring;
R₂ is selected from the group consisting of tertiary alkyl and tertiary aralkyl radicals;
R₅ is an arylene radical; and
R₈ is an alkyl radical.

13. The alkylideneperoxide of claim 10 selected from the group consisting of 2,2-di(alpha,alpha'-dimethylbenzyl-peroxy) propane and 1-tert.butylperoxy-1-(alpha, alpha'-dimethylbenzylperoxy) cyclohexane.

14. The alkylideneperoxide of claim 11, 2,2,5,5-tetra-(alpha,alpha'-dimethyl-benzyl-peroxy) hexane.

15. The alkylideneperoxide of claim 12, 1,4-[2,2'-di(tert. butylperoxy-isopropylperoxy)]-diisopropylbenzene.

16. The alkylideneperoxide of claim 10 wherein the corresponding hydroperoxide, HOOR₃, from which the radical —OOR₃ is derived is a hydroperoxide selected from the group consisting of cumylhydroperoxide, p-diisopropylbenzene-monohydroperoxide, m-diisopropylbenzene-monohydroperoxide, p-di-isopropylbenzene-dihydroperoxide and m-diisopropylbenzene-dihydroperoxide.

17. The alkylideneperoxide of claim 11 wherein the corresponding hydroperoxide, HOOR₃, from which the radical —OOR₃ is derived is a hydroperoxide selected from the group consisting of cumylhydroperoxide, p-diisopropylbenzene-monohydroperoxide, m-diisopropylbenzene-monohydroperoxide, p-di-isopropylbenzene-dihydroperoxide and m-diisopropylbenzene-dihydroperoxide.

18. A vulcanizable composition comprising an olefinic copolymer or terpolymer, a reinforcing filler, a free-radical acceptor and the alkylideneperoxide of claim 10.

19. A vulcanizable composition comprising an olefinic copolymer or terpolymer, a reinforcing filler, a free-radical acceptor and the alkylideneperoxide of claim 11.

20. A vulcanizable composition comprising an olefinic copolymer or terpolymer, a reinforcing filler, a free-radical acceptor and the alkylideneperoxide of claim 12.

21. The composition of claim 18 wherein the alkylideneperoxide is present in amount of from about 0.1 to 10 parts by weight per 100 parts of copolymer or terpolymer.

22. The composition of claim 21 wherein said olefin copolymer is a saturated amorphous copolymer of ethylene and alpha-olefin, having a molecular weight of between about 50,000 and 800,000 and an ethylene content of from about 20 to 80 mol percent, and the olefinic terpolymer is a terpolymer of the type ethylene/alpha-olefin/cyclic or acyclic polyene containing non-conjugated double bonds, having a molecular weight of between about 50,000 and 800,000, an ethylene content of from about 20 to 80 mol percent and from 0.05 to 1 double bond per 100 carbon atoms.

23. Vulcanized articles obtained from the composition of claim 18.

24. Vulcanized articles obtained from the composition of claim 19.

25. Vulcanized articles obtained from the composition of claim 20.

References Cited

UNITED STATES PATENTS

| | | | |
|---|---|---|---|
| 3,000,866 | 9/1961 | Tarney | 260—80.78 |
| 3,285,889 | 11/1966 | Arnold | 260—80.78 |
| 3,296,184 | 1/1967 | Portolani et al. | 260—41 |
| 3,342,872 | 9/1967 | Gerritsen et al. | 260—610 |

JOSEPH L. SCHOFER, Primary Examiner

STANFORD M. LEVIN, Assistant Examiner

U.S. Cl. X.R.

260—41, 88.2, 610

PO-1050
(5/69)

UNITED STATES PATENT OFFICE
CERTIFICATE OF CORRECTION

Patent No. 3,489,730            Dated January 13, 1970

Inventor(s) CARLO BUJTAR AND EMILIO MARTINI

It is certified that error appears in the above-identified patent and that said Letters Patent are hereby corrected as shown below:

Column 1, line 5, "Carlo Buttar" should read -- Carlo Bujtar --; line 19, "alkylidene-peroxides" should read -- alkylideneperoxide Column 2, line 22, equation (1),"

$$R-CH\begin{matrix}R'\\ OR'\end{matrix}$$

" should read

-- $R-CH\begin{matrix}OR'\\ OR'\end{matrix}$ -- ; line 50, equation (5),"

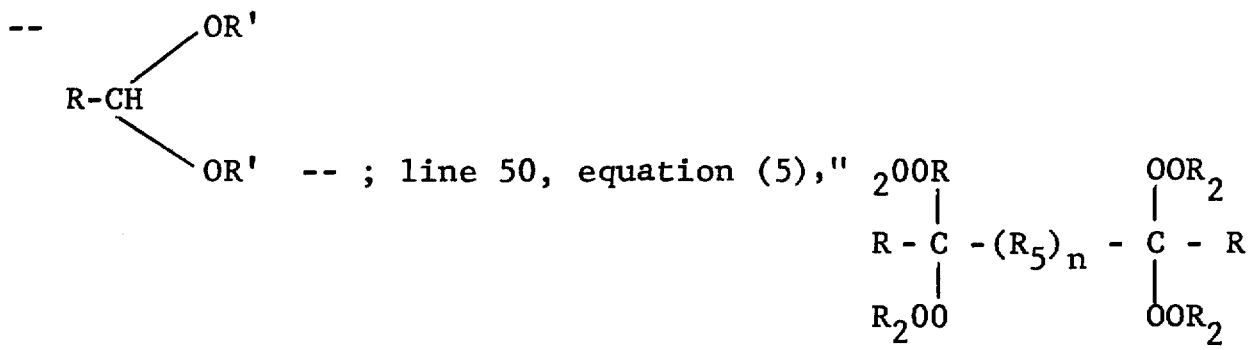

should read --

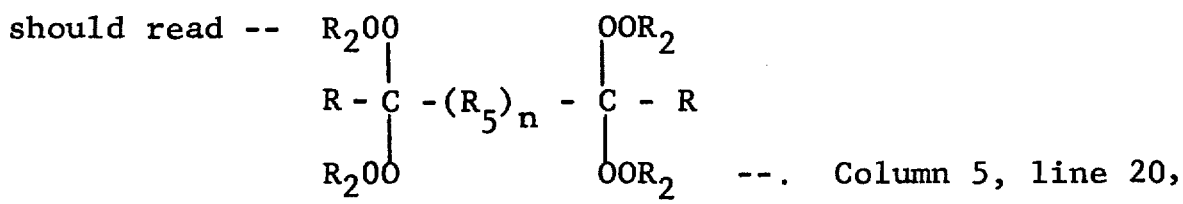

--. Column 5, line 20, "cyclopentyl-" should read -- cyclopentyl-, --.

SIGNED AND
SEALED

JUN 30 1970

(SEAL)
Attest:

Edward M. Fletcher, Jr.
Attesting Officer

WILLIAM E. SCHUYLER
Commissioner of Pat